Feb. 8, 1949.  G. H. PACKWOOD, JR  2,461,000
DISPENSER SUPPORT
Original Filed June 9, 1941
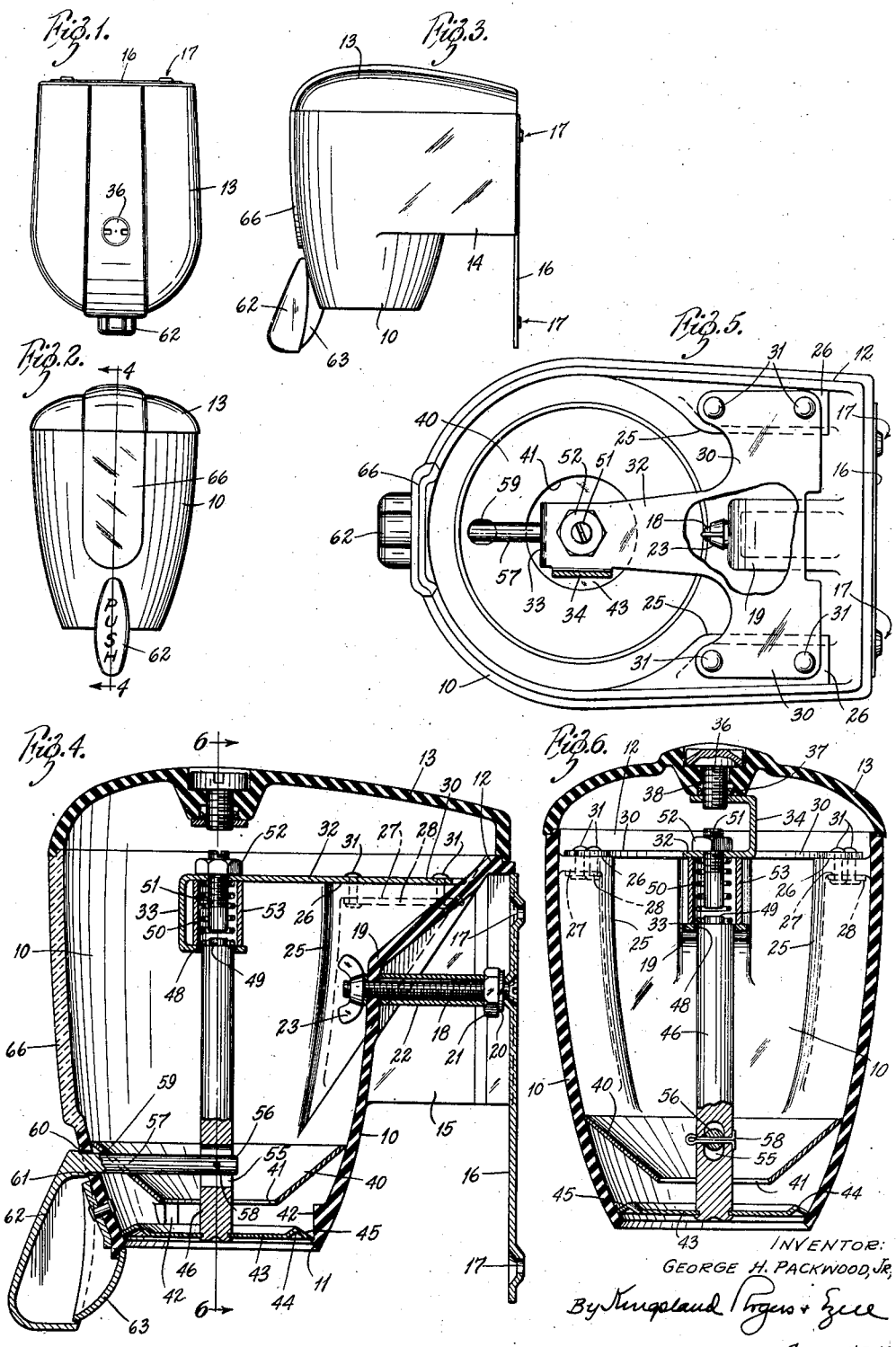
INVENTOR:
GEORGE H. PACKWOOD, JR,
By Kingsland Rogers & Ezell
ATTORNEYS.

Patented Feb. 8, 1949

2,461,000

UNITED STATES PATENT OFFICE 2,461,000

DISPENSER SUPPORT

George H. Packwood, Jr., St. Louis, Mo.

Original application June 9, 1941, Serial No. 397,158. Divided and this application September 15, 1944, Serial No. 554,185

5 Claims. (Cl. 248—203)

1

The present invention relates to a dispenser for finely divided material, and, more particularly, for powdered soap. Its uses are, of course, broader than merely the so-called powdered or finely divided soap, but for purposes of illustration it will be described in connection therewith.

Generally speaking, the dispenser includes a bowl with a removable cover thereon, an orifice in the bottom thereof, and with a valve controlling the orifice, the valve having a conveniently accessible operating handle for one hand operation of the dispenser.

An object involves the provision of a novel attaching means whereby the dispenser may be secured to a wall, or the like. More particularly, it is an object to provide an attaching means that gives rigid and secure fastening, and preferably one that cannot be released except at the instance of proper persons.

In the drawings:

Fig. 1 is a plan view of the dispenser;

Fig. 2 is a front elevation;

Fig. 3 is a side elevation;

Fig. 4 is a vertical front-to-rear medial section taken on the 4—4 of Fig. 2;

Fig. 5 is a top view with the cover removed and with a part broken away and a part in section; and, Fig. 6 is a vertical side-to-side medial section on the line 6—6 of Fig. 4.

This is a division of application Serial No. 397,158, filed June 9, 1941, now Patent No. 2,360,970.

The dispenser includes a bowl 10, the walls of which taper toward the bottom and terminate in an orifice 11, and also have a flared extension 12 at the rear. The bowl has a cover 13 extending over the entire top. The cover 13 fits around a groove cut about the tapered edge of the bowl 10.

Two flanges 14 and 15 extend downwardly from the rear of the bowl 10 and below the flared portion 12. These flanges are spaced from the wall portions forming the flare 12. They are enlarged at their back edges, and are notched to receive edges of an attaching plate 16 having holes 17 to receive screws for fitting into the wall. There is a screw 18 extending from the plate 16 to within the dispenser bowl, passing through an identation 19 outstanding from the back wall. A lock washer 20 and a locking nut 21 hold the screw 18 into the attaching plate 16. A spacer 22 is fitted between the nut 21 and the back wall of the bowl 10. A wing nut 23 inside the bowl then holds the bowl and the attaching plate 16 securely together by virtue of engaging against the

2 vertical part of the indentation 19, and drawing the plate 16 aginst the flange 15.

Within the dispenser bowl, the walls at the rear are brought inwardly as at 25, on their outsides, the walls 25 extending in horizontal ledges 26 across to the flanges 14 and 15. The ledges have upper surfaces 27 below the upper edge of the bowl.

A bracket 30, generally T-shaped, spans the two surfaces 26 and is secured by brads 31 into the ledges 26, the brads engaging through the ledges and into back-up plates 28 below the ledges, between the walls 25 and the flanges 14 and 15.

The bracket 30 has a projecting portion 32 extending out over the axis of the bowl 10. A forward extension 33 of this bracket is turned down and in. A lateral extension 34 on the forward end of the bracket is turned up and over. These two extensions provide two overhanging portions disposed along the axis of the bowl.

The upper extension 34 is internally threaded to receive a cover locking screw 36. The screw 36 is held within the cover by a sprng ring 37, and may be screwed into the bracket 34 for securing the cover to the bowl. Preferably the ring is disposed within an enlarged space 38, and below the upper end thereof, to provide some play, and to give freedom to movement of the screw when its head is engaged by a key.

The bracket 32 is used in connection with the valve which will now be described.

As previously stated, the walls of the bowl taper toward the orifice. Above the orifice there is a false bottom portion 40 which tapers downwardly and toward the axis of the bowl, and terminates in a circular opening 41. Beneath the false bottom 40, spaced guides 42 are located around the walls above the orifice 11. The inner edges of the guides 42 form a space slightly larger in diameter than the orifice.

A valve 43 engages the guides 42 and in its lower position seats against the tapered walls of the bowl just above the orifice. This valve preferably has an upstanding ridge 44 around its periphery giving it a sloping outer edge 45.

The valve is mounted on a plunger 46 of some mass to enhance its agitation qualities as will be described. This plunger or valve stem is disposed axially of the bowl 10, extends through the opening 41 and through an opening 48 in the lower extension 33. On the top of the plunger 46 is a knob 49 to receive one end of a coil spring 50, which also surrounds an adjustable abutment screw 51 threaded down from the top of the bracket 30. A lock nut 52 holds the screw 51 in adjusted position. Between the extension 33 and the top of the main bracket 30, a sleeve 53 is provided so that soap is excluded from the agitation chamber which contains the head of the plunger, the spring, and the abutment screw.

Toward the bottom, the plunger 46 has a slot 55 therethrough, into which extends one end 56 of a bell crank operating lever 57. A pin 58 holds the lever 57 in the slot and provides a means for pivotally transmitting movement of the lever to the plunger. The end 56 passes through a hole 59 in the false bottom 40, below the top thereof, and through an opening 60 in the bowl 10, which also is below the upper edge of the false bottom.

The lever 57 has a shoulder 61 engaging over the edge of the bowl 10 formed at the outer end of the opening 60. This shoulder provides a fulcrum for the lever. The portion of the lever outside the bowl forms a push button 62 which is hollow and open at its rear side. It fits over a depending closure 63 secured to the lower end of the bowl 10. The button 62 telescopes with respect to the closure 63.

It is desirable that the relationship between the taper 45 and the taper of the lower end of the wall of the bowl be related so as to provide the bridging action of the soap referred to in copending application Serial No. 234,186, filed October 10, 1938, Patent No. 2,307,291, issued January 5, 1943. In this action, soap above the valve escapes around the valve when it is lifted, but the relative angles mentioned produce a crowding action which establishes an arch or bridge between the surface 45 and the tapered walls of the bowl, which prevents further egress of soap from the dispenser.

The bowl has a front panel 66 that may be formed separately of clear material and inserted by a tongue and groove therearound. By this means the clear panel may be used to give view of the contents of the bowl, even when the bowl is of opaque material.

The operation of the dispenser will be fairly evident from the foregoing, especially taken in connection with the description in the parent application.

Attachment of the dispenser to a wall is accomplished by screwing the plate 16, with the screw 18 inserted therethrough, against the wall surface by screws passing through the holes 17. (It is of course evident that the plate may be otherwise attached, although screws are particularly cooperable with other features of the invention.) The large area of contact of the plate 17 assures a firm attachment, aided by the overhang of the flared portion 12 over the top of the plate 16, as appears in Fig. 4.

With the cover 13 removed from the bowl, the nut 21 properly tightened, and the sleeve 22 in place, the bowl may be engaged onto the plate 17. In this positioning, the screw 18 passes through the bowl wall, and the rear edges of the flanges 15 abut the edges of the plate 16. The bowl wall flares backwardly at the top, so that it, with the flanges 15 and the plate 16, form an inverted pocket in which at least one of the attaching screws is located.

The thumb nut 23 is then engaged onto the screw 18, and the attachment is complete.

After the cover 13 is attached, and the keyed screw 36 tightened, the dispenser may not be removed by unauthorized persons. The wing nut 23 is inaccessible, and at least some of the plate attaching screws are not accessible to a screw driver.

What is claimed is:

1. In a dispenser, a bowl, spaced flange walls extending backwardly from the bowl and having exposed edges, an attaching means engageable across the edges of said flange walls over a substantial area and adapted to be secured to a wall or the like, said attaching means and the flanged walls being shaped to provide an enclosure, means on the attaching means to receive removable securing means, said means on the attaching means being disposed within the enclosure between the flange walls and the bowl when the dispenser is attached to be accessible only when the bowl and attaching means are disengaged, and means accessible only from within the bowl for securing the bowl to the attaching means.

2. In a dispenser, a bowl having an opening in the bottom thereof, and means supporting the bowl on a wall or the like, with the orifice spaced from the wall, comprising a pair of spaced flanges extending backward from the bowl, the bowl having a backward extension providing a flaring portion covering the tops of the flanges and forming therewith an enclosure, a plate to be attached across the flanges, having means adapted to receive wall-attaching means through it, said receiving means being located in the enclosure between the flanges and inaccessible when the plate and bowl are secured together, and a securing means attached between the plate and the bowl, said attaching means being removable only from inside the bowl.

3. In a dispenser, a bowl formed of molded material, said bowl having walls converging downwardly from a top toward a bottom, a pair of integrally formed, generally vertical, molded flanges extending outwardly from the bowl wall in spaced relation, said walls having their outer edges formed parallel to receive a plate in spanning and abutting relation, the bowl wall having an integrally formed portion across the tops of the flanges and joined thereto, that extends from substantially the outer edges of the flanges at their tops, to the main body of the bowl wall, and is shaped to provide a downwardly and inwardly extending surface portion in the bowl, the flanges, bowl wall and the integrally formed portion providing a pocket.

4. In a dispenser, a bowl having a bottom opening therein, an attachment member adapted to be attached to a support, a pair of spaced wall-like members adapted to extend edgewise with respect to the bowl wall, from the wall to the attachment member, the bowl wall adjacent the wall-like members having a slope extending upwardly and toward the attachment member, and having its upper edge substantially adjacent the attachment member, the wall-like members converging upwardly, a cover for the bowl extending over said sloped part of the bowl, and clamping means extending from the bowl wall to the attachment member, with the wall-like members therebetween.

5. In a dispenser, a bowl having a bottom opening therein, an attachment member adapted to be attached to a support, a pair of spaced wall-like members adapted to extend edgewise with respect to the bowl wall, from the wall to the attachment member, the bowl wall adjacent the wall-like members having a slope extending upwardly and toward the attachment member, and having its upper edge substantially adjacent the attachment member, the wall-like members converging upwardly, a cover for the bowl extending over said sloped part of the bowl, and clamping means extending from the bowl wall to the attachment member, with the wall-like members therebetween, the bowl wall having a portion substantially parallel to the attachment member to receive the clamping means.

GEORGE H. PACKWOOD, Jr.

REFERENCES CITED

The following references are of record in the file of this patent:

UNITED STATES PATENTS

| Number | Name | Date |
|---|---|---|
| 461,208 | Markell | Oct. 13, 1891 |
| 577,368 | McCarroll et al. | Feb. 16, 1897 |
| 1,208,137 | Giles | Dec. 12, 1916 |
| 2,307,291 | Packwood | Jan. 5, 1943 |